PHASE MODULATION NETWORKS USING VARIABLE CAPACITY DIODES

Filed July 23, 1962 3 Sheets-Sheet 1

Aug. 16, 1966 P. C. BROSSARD ETAL 3,267,393

PHASE MODULATION NETWORKS USING VARIABLE CAPACITY DIODES

Filed July 23, 1962 3 Sheets-Sheet 3

3,267,393

PHASE MODULATION NETWORKS USING VARIABLE CAPACITY DIODES

Pierre Claude Brossard, Boulogne-sur-Seine, France (9 Rue des Fleurs, Montigny-le-Bretonneux, France), and Jacques Raymond Francois Chassagne, Villiers-sur-Marne, France (Immeuble, Clement Ader, Les Sapins, Rouen, France)

Filed July 23, 1962, Ser. No. 211,781
Claims priority, application France, Dec. 19, 1961, 882,438
5 Claims. (Cl. 332—30)

Figure 1:
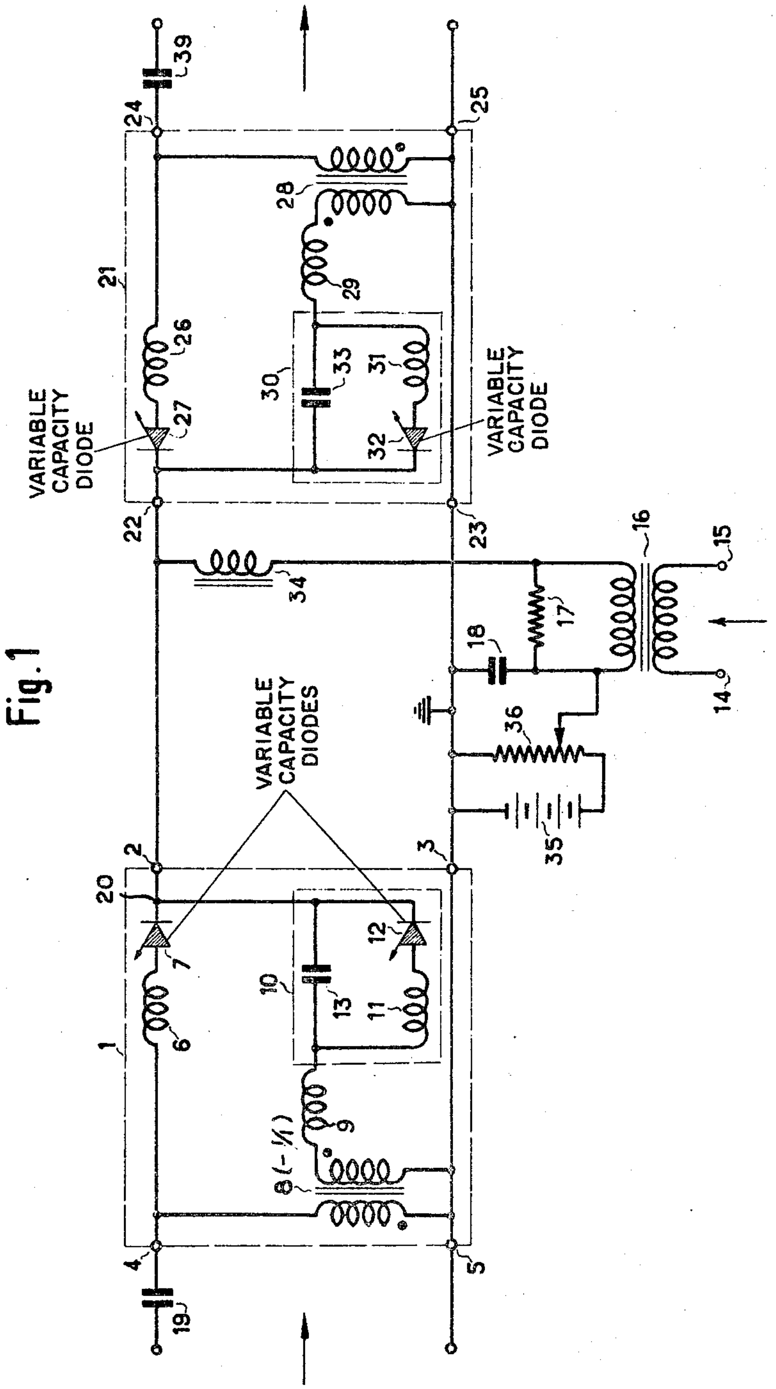

The present invention relates to a new phase modulation network in which variable capacity semi-conductor diodes form elements which have a reactance varying as a function of the instantaneous amplitude of a modulating signal applied thereto.

It is well known that a phase modulation network enables the phase of an unmodulated carrier current, supplied by a suitable source, to be varied by an alternating control signal such as the modulating signal.

In phase-modulated transmission systems employing only a small number of channels, an important parameter is the phase-shift corresponding to the maximum level of the modulating signal. It is well known that this maximum phase-shift should have a high value, something which is hardly possible to achieve with simple phase modulation networks, and that in order to attain this value it is necessary to apply frequency multiplication to the modulated signals issuing from the phase modulation network. The maximum modulation phase-shift obtained at the terminals at the end of the frequency multiplication chain is then equal to that of the phase modulator proper, multiplied by the multiplication factor $n$ of the chain.

The phase-modulated signal obtained at the output of the frequency multiplication chain is always accompanied by parasitic modulation products arising in the frequency multiplication stages and whose amplitudes should be sufficiently low not to interfere with communication channels tuned to adjacent frequencies. In the case of tropospheric telephony communication or relay work using artificial satellites, these parasitic signals must be considerable attenuated with respect to the useful signals since communication of this type require powers which can exceed ten kilowatts.

In order to fix certain dimensions, there follows a typical example of a frequency modulated transmitter as studied by the applicants. The 17.5 mc./s. carrier frequency ($f$) current is produced by a high stability crystal-controlled oscillator. The output signal has nine times the frequency of the fundamental (frequency multiplication factor $n=9$), the final frequency being around $$f_t = 9 \times 17.5 = 157.5 \text{ mc./s.}$$

Experience has shown that the multiplication factor $n=9$ is a favorable one since the most powerful of the parasitic signals, thus the ones requiring most attenuation, have frequencies given by:

$$f_t - f = (n-1)f = 140 \text{ mc./s.}$$
$$f_t + f = (n+1)f = 175 \text{ mc./s.}$$

Since both these frequencies differ by 17.5 mc./s. transmission frequency of 157.5 mc./s., it will be seen that the corresponding parasitic signals are relatively easy to filter out. However, filtering is only possible if $(f_t-(n\pm 1)f)/f_t$; i.e. $1/n$ exceed a certain minimum value; consequently the filtering requirement limits the value $n$ of the permissible frequency multiplication. This means that if it is required to increase the final maximum modulation phase-shift of the equipment concerned, it is necessary to have as high as possible a phase-shift in the phase modulator too.

The object of this invention is a phase modulator using variable capacity diodes and having a maximum modulation index sufficiently large to require no subsequent frequency multiplication or to require frequency multiplication of a relatively low order only.

Variable capacity diodes are well-known to those skilled in the art. They are semiconductor diodes in which the p-n junction has been so designed that the variation in the capacity of the diode, as a function of the voltage across the junction, is considerable. If a reverse D.C. voltage is applied to a semiconductor diode of this type, the two regions adjacent to the junction are emptied of conducting elements and the junction acts as a capacitor. Variations in the voltage applied to the junction modify the capacity in a manner dependent upon the concentration of impurities with respect to the distance to the junction. The variable capacity C as a function of the voltage $(V_o+x)$ applied to the junction, is given by:

$$C(x) = C_o/(V_o+x)^p \quad (1)$$

where $C_o$ is a constant, $V_o$ a bias voltage, $x$ a signal amplitude and $p$ an exponent between 0.5 for an abrupt junction and 0.3 for a gradual junction.

Phase modulation networks using variable capacity diodes have already have already been proposed by other workers in this field.

The phase modulation network according to the invention comprises two phase-shift networks of identical construction and having the same characteristics, connected in cascade. The carrier frequency current is applied across the input terminals to the first network, the modulating signal across common terminals to both networks, these being interconnected, and the phase-modulated high frequency signal picked up at the output terminals of the second network.

In an article by Collins Arsem entitled "Wideband F–M with capacitance diodes" which appeared in the American publication "Electronics," volume 32, No. 49, December 1959, pages 112 to 113, a phase modulation network is described. This network includes a Hartley oscillator, the oscillator circuit of which has, in place of a capacitor, two variable capacity diodes. With respect to the fixed bias source, these two diodes can be considered as being mounted in parallel and with respect to the modulator as being mounted in parallel and with respect to the modulator as being connected in series. Thus, the instantaneous frequency of the oscillator varies in accordance with the modulating signal since this signal alters the capacity of the two diodes in the oscillator circuit.

Although this phase modulation network is very effective, it is difficult to use in the case of beamed tropospheric telephony communications since with a self-exciting oscillator of this type the stability obtainable with crystal control is lacking. Receivers operating in connection with transmitters using the modulating network considered should include radio frequency circuits of very wide band width in order to accommodate the frequency deviations which the modulation network concerned can produce. This being the case, the receiver will be open to thermal noise and other parasitic signals.

In an article by A. C. Todd, R. P. Shuck and H. M. Sachs entitled "Using voltage-variable capacitors in modulator designs," which appeared in the American publication "Electronics" of Jan. 20, 1961 on pages 56–63, the modulation network proposed does not suffer the disadvantages of the one described above since it can be used in conjunction with carrier signals obtained from a crystal-controlled oscillator.

This modulation network comprises a transformer the primary winding of which carries the carrier current, a resistor in series with a variable capacitor diode being connected across the terminals of the secondary. This same secondary winding has a middle tapping to which is connected one of the terminals of the primary winding of a further transformer whose secondary delivers the modulated signal. The other primary terminal of the latter transformer is connected to a point common to the resistor and the variable capacity diode just mentioned. The voltage across the terminals of the diode-resistor assembly is in phase with the carrier voltage; the voltage across the terminals of the diode is in anti-phase with the voltage across the terminals of the resistor. This means that the voltage of the modulated signal, the amplitude of which is constant, has a phase which can vary between ±90 degrees.

The arrangement of the just considered modulation network does not permit the use of very high frequency carrier currents, due to the fact that the imperfections of the transformer through which this carrier current passes cannot be corrected by appropriate networks. Thus, the arrangement described is limited to carrier signals the frequency of which is around 1 mc./s. On the other hand, the presence of the resistor in series with the variable capacity diode means the modulation network referred to does not have purely reactive characteristics and thus considerably attenuates the carrier. The modulation index of this modulator, given that certain conditions of linearity are satisfied, is in the order of 22.5 degrees.

On the contrary, the phase modulation network of the invention practically allows an overall maximum phase variation of 180 degrees in each of the two cascade connected phase-shift networks. Again, since these phase-shifting networks have zero attenuation, the carrier is not attenuated at all. Furthermore, the arrangement envisaged permits correction of the transformer with a view to working with high frequency carriers.

Each of the two cascade connected networks, which may be theoretically derived from an equivalent lattice type phase-shift network of real characteristic impedance, consists of a single series branch and two parallel branches. The series branch includes series circuit comprising an inductor and a capacitor, the variable element being the capacitor. In one of the parallel branches is inserted a transformer winding and in the other is the second winding of said transformer in series with a phase-shift network producing a shift of 90 degrees, the branch finishing in a series circuit identical with that in the just described series branch.

The 90° phase-shift network serves the purpose of transforming the variable capacity series circuit connected to its output into the equivalent of a variable inductance parallel circuit connected at its input. This allows both series and parallel branches to make use of identical variable reactance elements which, in this invention, are variable capacity diodes. Further, these capacitive elements have a common connection point to which both modulating signal and bias voltages may be applied.

Figure 2A:
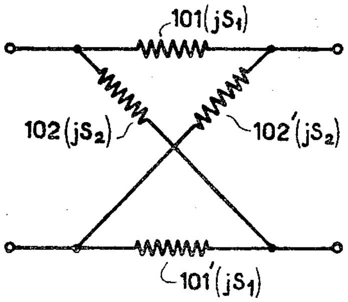
Figure 2B:
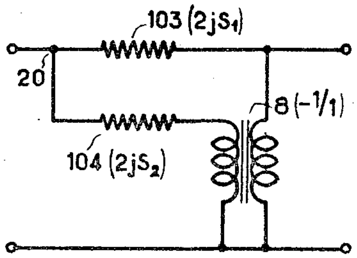
Figure 2C:
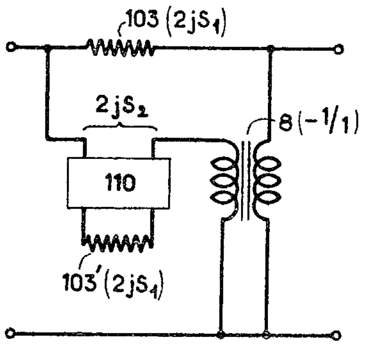
Figure 2D:
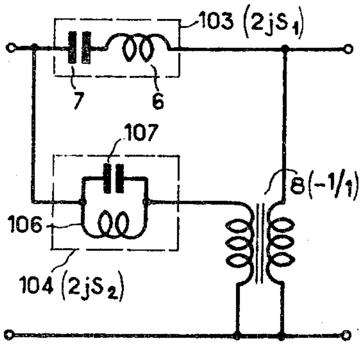
Figure 2E:
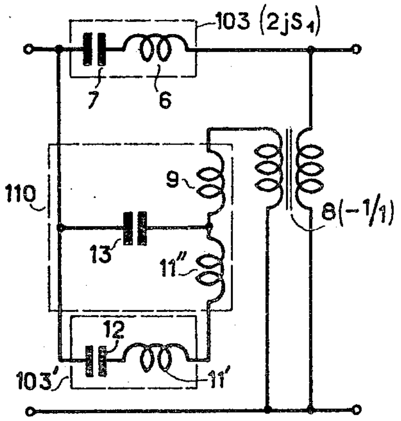
Figure 2F:
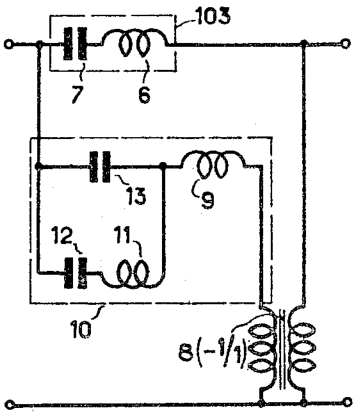
Figure 3:
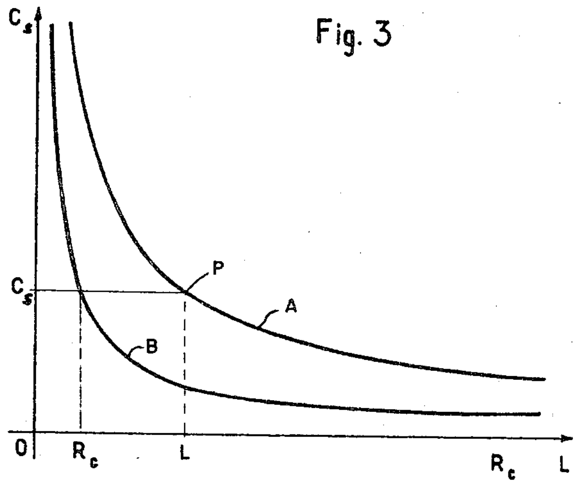
Figure 4:
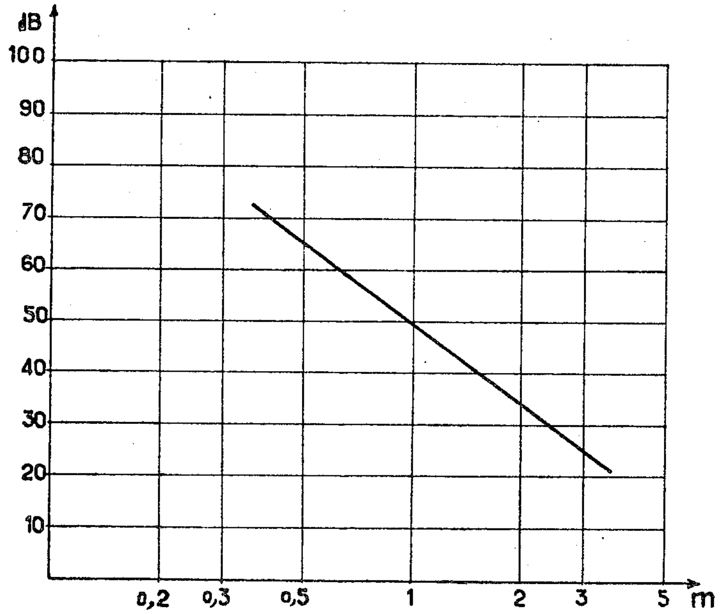

The modulation network of the invention will now be described in detail, reference being made to the attached drawings, in which:

FIG. 1 represents the phase modulation network of the invention,

FIGS. 2*a* to 2*f* are explanatory diagrams which show how each of the two cascade connected sub-networks represented in FIG. 1, is derived from a straightforward lattice type phase-shift network having a real characteristic impedance, FIG. 3 is a graph permitting the reactive elements of the phase modulation network to be determined once the variable capacity diodes to be used are known, FIG. 4 is a curve showing the harmonic distortion of the modulation network of the invention as a function of the modulation index of a high frequency transmitter.

Referring to FIG. 1, the phase modulator of the invention comprises two identical phase-shift networks 1 and 21 connected in cascade and consequently interconnected via their terminals 2–3 and 22–23. The series branch of each network comprises an inductor, 6 and 26 respectively, and a variable capacity diode, 7 and 27 respectively. The parallel branches contain in the one case the primary winding of a transformer, 8 and 28 respectively, and in the other case the secondary of this transformer in series with an inductor 9 and 29 respectively, and a parallel network, 10 and 30 respectively. The network 10 comprises an inductor 11 in series with a variable capacity diode 12 both of which are in parallel with a capacitor 13. In a similar fashion, the network 30 comprises an inductor 31 in series with the variable capacity diode 32 both of which are in parallel with a capacitor 33.

The carrier current is applied across terminals 4–5 of network 1 and the phase modulated signal is obtained at terminals 24–25 of network 21.

As will be shown in the following, each of the networks 1 and 21 is equivalent to a straight lattice type phase-shift network in which one series branch and one cross branch each contain an inductor and a capacitor in series, these forming reactive series circuits in which a single element, the capacitor, is variable (this variable capacitor being here a variable capacity diode). The assembly formed by a variable capacitor in series with a fixed inductor in the parallel branch may be transformed into a fixed capacitor in parallel with a variable inductor by an auxiliary 90° phase-shift network.

The modulating signal is applied to terminals 14–15 of the matching transformer 16 shunted by a resistor 17. The terminals of the secondary winding of transformer 16 are connected to terminals 2–3 and 22–23 of the two networks considered, 1 and 21, across a choke inductor 34 and a decoupling capacitor 18, respectively.

The series and parallel branches of the two networks 1 and 21 are not exactly the same in composition. However, at the frequency of the modulating signal, the impedances of the inductors 6, 9 and 11 and that of the transformer windings 8 (also the impedances of inductors 26, 29 and 31 and that of the transformer windings 28) are very low, the impedance of the capacitor 13 (or the impedance of the capacitor 33) being very high. In view of this, the four variable capacity diodes 7, 12, 27 and 32 can be considered as subject to equal variations in potential as far as the modulating signal is concerned and to equal bias voltages.

The bias voltage for the diodes 7, 12, 27 and 32 is obtained from the D.C. voltage source 35 shunted by potentiometer 36.

With the aid of FIGURES 2*a* to 2*f* it can now be shown how the networks 1 and 21 are derived from a straight lattice type phase-shift network, having in its branches circuits of the "series" and "parallel" type.

The FIG. 2*a* represents a straight lattice type phase-shift network having a fixed, real input impedance. The two series and two parallel arms are constituted by the purely reactive elements 101 and 101', 102 and 102' together with corresponding imaginary impedances $jS_1$ and $jS_2$ of opposite sign (with $j=\sqrt{-1}$). The characteristic resistance $R_c$ of the straight network is such that $$-S_1S_2=R_c^2 \quad (2)$$

The phase-shift angle is given by the expression $$\tan(\varphi/2)=S_1/R_c=-R_c/S_2 \quad (3)$$

As is well known (see C. A. GUILLEMIN, Communication networks," John Wiley and Sons, New York, 1949, page 161, the network of FIG. 2*a* is equivalent to the network FIG. 2*b* where 8 is a transformer, of ratio (−1), having tight coupling. The single series branch is comprised of an element 103 having a reactance of $2jS_1$, and the parallel arm containing the primary of transformer 8 likewise has an element 104 having a reactance of $2jS_2$. It will be seen that the reactance elements $2jS_1$ and $2jS_2$ have a common point which, as we are about to show, permits bias and modulating signal voltages to be simultaneously applied to both the variable capacity diodes which constiute, in part at least, the elements 103 and 104.

In the network of FIG. 2*b* the variable element in the 103 assembly is capacitive and the variable element in the 104 assembly inductive. In FIG. 2*c* the element 104 is replaced by the input reactance of the auxiliary phase-shift network 110 having a characteristic impedance $2R_c$, and a 90° phase-shift factor.

This network, when terminated in an element 103' having a reactance of $2jS_1$, has an input reactance of $2jS_2$. A network of this sort when expressed in chain matrix form is as follows:

$$\begin{Vmatrix} 0 & 2jR_c \\ \frac{1}{2R_c} & 0 \end{Vmatrix}$$

It is well known that a phase-shift network of this type, having a phase-shift factor of 90 degrees, can take the form of a low-pass filter operated below its cut-off frequency.

In FIG. 2*d*, the element 103 (FIG. 2*b*) in the series arm is constituted by an inductor 6 of inductance $L_1$ and a capacitor 7 of capacity $C_1$, in series. Thus, the element 103 has a reactance of $$2S_1=L_1\omega-\frac{1}{C_1\omega}$$

where $\omega$ is the angular frequency. In accordance with Equation 2 the element 104 (FIG. 2*b*) in the parallel branch is constituted by an inductor 106 having an inductance of $L_2$ and a capacitor 107 having a capacitance $C_2$ so that:

$$C_2=L_1/4R_c^2$$
$$L_2=4R_c^2\,C_1$$

In FIG. 2*e*, the network 104 of FIG. 2*d* is replaced by network 103' comprising an inductor 11' identical to the inductor 6 and a capacitor 12 identical to capacitor 7. The phase-shift network 110, having a 90° phase-shift, is part of a low pass filter comprising two inductors 11'' and 9 in the series branch and capacitor 13 in the parallel branch. As will be known to those skilled in the art, a network of this sort does not have a constant characteristic impedance; its impedance varies with the frequency of the signal passed. It is worth noting that since the phase-shift network 110 is only used in conjunction with very narrow frequency bands, this variation in the characteristic impedance is not important.

Finally, in FIG. 2*f*, the two inductors 11' of network 103 and 11'' of filter 110 are merged into a single inductor 11. The structure of the networks 1 and 21 of FIG. 1 is hereby exactly reproduced.

It will now be shown how the reactances of the network elements are determined in accordance with the characteristics of the variable capacity diodes used.

If $\varphi(x)$ represents the phase-shift value introduced by the modulation network of the invention for an instantaneous modulating signal amplitude $x$, we can write:

$$\varphi(x)=\varphi(0)+x\varphi'(0)+\frac{x^2}{2}\varphi''(0)+\dots \quad (4)$$

Modulation is linear if $\varphi''(0)$ and terms of higher order are zero. Due to the fact that there are two cascade connected phase-shift networks, Equation 3 now gives us:

$$\tan(\varphi/4)=S_1/R_c=L\omega/2R_c-\tfrac{1}{2}\omega R_c C(x) \quad (5)$$

where L is the inductance of inductor 6 (or 26) and $C(x)$ the capacity of the variable capacity diode 7 (or 27).

The relationship (5) can be written:

$$\varphi(x)=4\tan^{-1}[L\omega/2R_c-\tfrac{1}{2}\omega R_c C(x)] \quad (6)$$

and taking into account (1)

$$\varphi(x)=4\tan^{-1}[L\omega/2R_c-(V_0+x)^{1/2}/2\omega R_c C_0] \quad (7)$$

assuming $p=\tfrac{1}{2}$

If we let $$a=L\omega/2R_c$$
$$b=\tfrac{1}{2}R_c C_0\omega$$
$$y=a-b(V_0+x)^{1/2}$$

Equation 7 can be written:

$$\varphi(x)=4\tan^{-1}y(x) \quad (8)$$

The conditions for linearity $\varphi''(0)=0$ and $\varphi'''(0)=0$ are written, respectively:

$$1+y^2(0)-2y(0)y'^2(0)/y''(0)=0 \quad (9)$$

$$y'''(0)y(0)-y'(0)y''(0)-y(0)y''^2(0)/y'(0)=0 \quad (10)$$

The set of Equations 9 and 10 enable us to determine $a$ and $b$. After a simple calculation, we find:

$$a=\sqrt{3} \qquad b=2/\sqrt{3V_0}$$

Introducing the parameter $C_s=C_0V_0^{-1/2}$ which is simply the capacity of a variable capacity diode subjected to bias voltage $V_0$ only, we find:

$$L=3/2\omega^2C_s \quad (11)$$
$$R_c=3/4\omega C_s \quad (12)$$

Equations 11 and 12 show that L and $R_c$ are two hyperbolic functions of $C_s$ as represented by the curve of FIG. 3. The actual curves depend on the angular frequency and can immediately be plotted once the carrier frequency is known. $C_0$ is a constant factor for a given variable capacity diode. From $C_0$ can be deduced $C_s$ and from $C_s$, L and $R_c$.

In FIG. 3, there are shown two curves designated by A and B, respectively. Curve A shows the value of the suitable capacity $C_s$ as a function of that of inductance L, curve B the value of the same capacity as a function of resistance $R_c$. With the aid of these curves, the values of the circuit elements may easily be determined through the following procedure:

The curves having been plotted from Equations 11 and 12 for a given value of the carrier frequency, the desired value of $R_c$ is arbitrarily chosen. A vertical straight line with the given abscissa $R_c$ intersects curve B at a point representing the required value of $C_s$. Now, from the so obtained point $C_s$ on curve B, a horizontal straight line is drawn; it intersects curve A at a certain point P. A vertical straight line drawn from P will cut the axis of abscissae at a point having an abscissa equal to the required value of L.

By way of example, typical values, for the elements in a phase-shift network of the type described and for a carrier frequency of 17.5 mc./s., are as follows:

$V_0=20$ volts
$\omega=2\times17.5\times10^6\sim110\times10^6$
$C_s=56$ micromicrofarads for $V_0=4$ volts; therefore $C_s=25$ micromicrofarads for $V_0=-20$ volts;
$R_c=150$ ohms
$L=4.7$ microhenries (inductances 6 and 26)
Inductors 11 and 31=7.4 microhenries
Capacitors 13 and 33=30 micromicrofarads
Capacitors 19 and 39=1000 micromicrofarads With a modulation network to the above specification, were obtained:

(a) A modulation index $m$ of 3.4

(b) Harmonic distortion attenuation of value A as a function of the modulation index $m$ in accordance with the following table:

| $m$: | A |
|---|---|
| 0.5 | 65 |
| 1 | 50 |
| 2 | 35 |
| 3 | 25 |

These tabulated results are also plotted in graph form in FIG. 4.

What is claimed is:

1. A high-frequency phase modulator comprising at least one four-terminal network including first and second terminal pairs, a series branch between a first terminal of said first pair and a first terminal of said second pair; a unit turn ratio phase-reversing transformer having a first winding connected across the terminals of said second pair and having one end of a second winding connected to the second terminal of said first pair, a circuit connecting the other end of said second winding to said first terminal of said first pair, said circuit having as its input terminals those of an auxiliary reactive 90-degree phase-shifting four-terminal network the output terminals of which are closed on a further circuit branch substantially identical with said series branch, said series and further branches each consisting of an inductor in series connection with a variable capacity semiconductor diode, and a direct connection between said second terminal of said first pair and said second terminal of said second pair; means for applying a carrier-current high frequency voltage across one of said terminal pairs of means for applying a modulating signal voltage in series with a D.C. bias voltage across both said diodes, and means for receiving a phase-modulated high-frequency voltage at the other of said terminal pairs; said transformer having as a common point to its first and second windings said second terminal of said first terminal pair and said windings being wound in opposite directions from said common point.

2. A phase modulator as claimed in claim 1, wherein said auxiliary phase-shifting circuit is a low-pass filter.

3. A phase modulator as claimed in claim 2, wherein said low-pass filter consists of a series inductance and a shunt capacitance, and wherein said series inductance and said inductor are merged into a single inductor.

4. A phase modulator as claimed in claim 1, wherein said means for applying said modulating voltage include an inductance coil having a high impedance for carrier frequency currents and a condenser having a high impedance for modulating frequency currents.

5. A phase modulator as claimed in claim 1, comprising two of said networks in cascade connection with the second terminal pairs of both said networks in parallel connection, and with said means for applying said modulating voltage connected across said parallel-connected terminal pairs.

References Cited by the Examiner

UNITED STATES PATENTS

| | | | |
|---|---|---|---|
| 2,555,959 | 6/1951 | Curtis | 332—30 |
| 3,101,452 | 8/1963 | Holcomb et al. | 332—30 |

ROY LAKE, *Primary Examiner.*

A. L. BRODY, *Assistant Examiner.*